United States Patent [19]

Achiha

[11] 4,348,689

[45] Sep. 7, 1982

[54] PHASE ADJUSTING SYSTEM FOR CARRIER CHROMINANCE SIGNAL

[75] Inventor: Masahiko Achiha, Iruma, Japan

[73] Assignees: Hitachi, Ltd.; Hitachi Denshi Kabushiki Kaisha, both of Tokyo, Japan

[21] Appl. No.: 186,744

[22] Filed: Sep. 12, 1980

[30] Foreign Application Priority Data

Sep. 12, 1979 [JP] Japan ............................ 54-116204

[51] Int. Cl.³ ..................................... H04N 9/535
[52] U.S. Cl. ................................. 358/31; 358/40
[58] Field of Search ................. 358/11, 21 R, 31, 40

[56] References Cited

U.S. PATENT DOCUMENTS

| | | | |
|---|---|---|---|
| 4,178,609 | 12/1979 | Beuter | 358/31 |
| 4,212,028 | 7/1980 | Drewery | 358/11 |
| 4,223,341 | 9/1980 | Drewery | 358/11 |
| 4,241,363 | 12/1980 | Maeyama | 358/31 |
| 4,263,612 | 4/1981 | Gibson | 358/31 |

FOREIGN PATENT DOCUMENTS 47792 4/1980 Japan ............................ 358/40

*Primary Examiner*—Michael A. Masinick
*Attorney, Agent, or Firm*—Craig and Antonelli

[57] ABSTRACT

A phase of a composite color television signal is adjusted by utilizing a signal which is one-field after or before relative to a current signal and which is a signal of the nearest scanning line. A difference signal between the color television signal and a signal derived from a one-field memory is applied to a band-pass filter and an output signal of the band-pass filter is added to the color television signal so that the phase of the carrier chrominance signal is adjusted by 180 degrees. The phase adjuster according to the present invention is applicable to video signal processing systems such as a noise reducer and a differential PCM coder.

7 Claims, 18 Drawing Figures

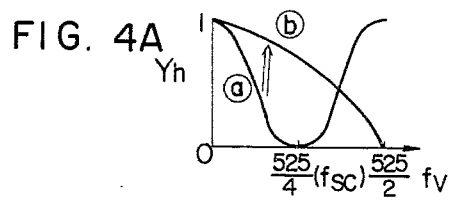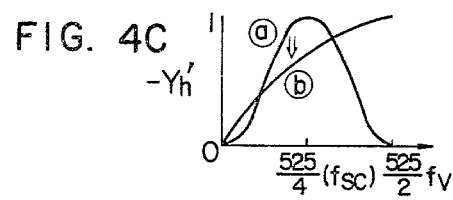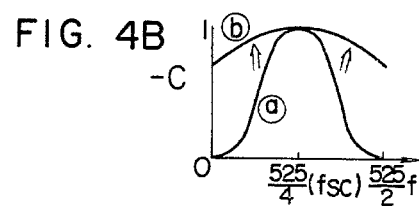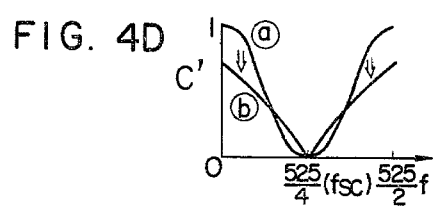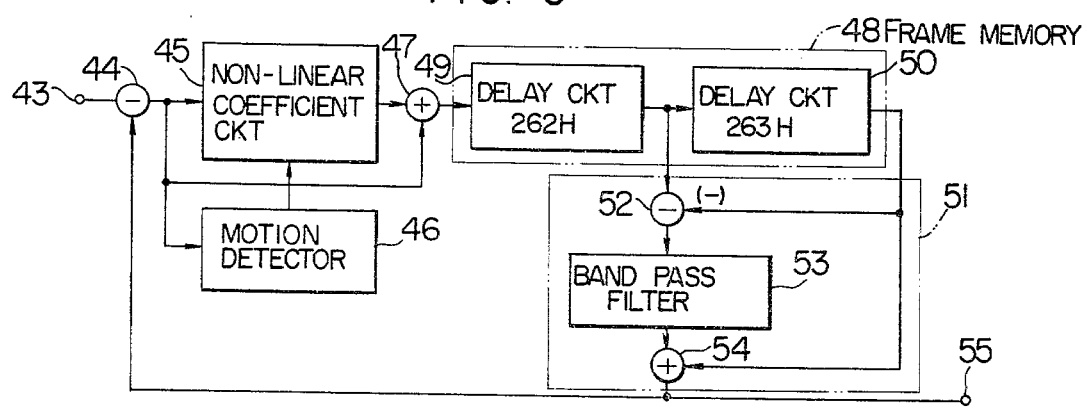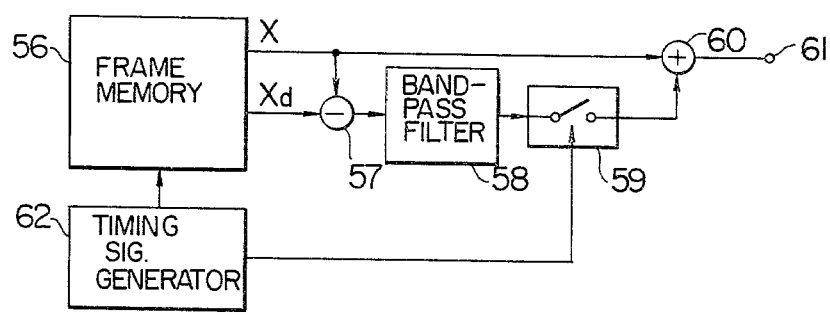

PHASE ADJUSTING SYSTEM FOR CARRIER CHROMINANCE SIGNAL

BACKGROUND OF THE INVENTION

1. Field of the Invention

The present invention relates to a phase adjusting system for a carrier chrominance signal, and more particularly to a phase adjuster for a carrier chrominance signal of a composite color television signal of the NTSC or PAL system in which a carrier chrominance signal modulated with chrominance components is superimposed on a luminance signal.

2. Description of the Prior Art

It has been known in the art of processing a television signal to compare a current input signal with an input signal of one frame before thus determining the change of a picture image on a difference signal between those frames and encoding only the changed portions of the picture image in order to reduce the amount of data to be transmitted, and repeating a preceding signal for only the unchanged portions in order to reduce noises, or to record a picture signal of one frame thus producing a still picture therefrom. In those signal processing techniques, when a composite color television signal of the NTSC or PAL system or the like is used, the phase of a chrominance subcarrier signal changes at every horizontal scanning period by 180 degrees in the NTSC system and by 90 degrees in the PAL system. Accordingly, there exists a phase difference of 180 degrees (in the NTSC system) or 90 degrees (in the PAL system) between a current input signal and an input signal of one frame before. Accordingly, when the change in the picture image is to be detected by the difference signal between those frames, a large difference signal may be produced due to the phase difference of the carrier chrominance signal in spite of the fact that the picture image does not change and the circuit may erroneously determine as if the change or the movement had occurred. Accordingly, it is necessary to use a phase adjusting circuit for a carrier chrominance signal in order to adjust the phases of the carrier chrominance signal between two adjacent frames in order to match the phase of a carrier chrominance signal of one frame before with the phase of a current carrier chrominance signal.

In the past, as will be described in detail with reference to FIG. 1 later as a system for adjusting the phase of a carrier chrominance signal of a composite color television signal, a signal of a scanning line of one horizontal scan period before or after was utilized. In this prior art phase adjusting system for the carrier chrominance signal, when a picture image causes a vertical change of chrominance components or when a luminance signal includes oblique frequency components, a correct carrier chrominance signal was not produced. Accordingly, when the change of the picture image is detected from a difference signal between a current input signal and an input signal of one frame before, there are some instances where the circuit will malfunction. Therefore, the development of a more accurate phase adjuster for the carrier chrominance signal has been desired. Also, in a still picture image reproducing apparatus in which an NTSC system signal of one frame is stored in a frame memory and it is repetitively read out, when one frame of a color television signal is to be constructed by inverting the polarities of the carrier chrominance signals of every other frames by the phase adjuster for a carrier chrominance signal described above, a flicker may appear at an edge of the picture image, for that reason discussed above.

SUMMARY OF THE INVENTION

It is an object of the present invention to provide a phase adjuster for a carrier chrominance signal of an NTSC or a PAL system composite color television signal which may correctly adjust the phase of the carrier chrominance signal.

In order to achieve the above object, according to the present invention, the phase adjustment of the carrier chrominance signal of the composite color television signal is attained by utilizing a signal of a scanning line which is the most adjacent scanning line of one field before or after. More specifically, based on low frequency components of a first composite color television signal in which a chrominance subcarrier modulated with chrominance components is superimposed on a luminance signal, and high frequency components of the first composite color television signal and a second composite color television signal of a scanning line which is to be displayed with one field separation from and adjacent on a screen to the first composite color television signal, there is provided a composite color television signal having a carrier chrominance signal having a phase which differs from that of the first composite color television signal by 90 degrees, 180 degrees or 270 degrees.

According to the above features of the present invention, a distance on the screen between the scanning lines utilized may be reduced to be one half of that with the known phase adjustor for a carrier chrominance signal to that a high quality and less degraded phase adjustment of the carrier chrominance signal may be attained. While a one-field delay circuit is additionally needed to compare with the prior art system, the color television signal processing system which requires such a phase adjusting system generally includes a frame memory and the like for providing the difference signal between the frames and hence it may be shared with one-field delay circuit. Therefore, the number of the circuit components does not increase substantially.

The above-mentioned and other features and objects of the present invention will become more apparent by reference to the following description taken in conjunction with the accompanying drawings.

BRIEF DESCRIPTION OF THE DRAWINGS

FIGS. 4A to 4D each show frequency characteristic of the filters shown in FIGS. 3C to 3F.

FIG. 5 shows a block diagram for illustrating one embodiment of a noise reducer which embodies the phase adjuster for a carrier chrominance signal according to the present invention.

FIG. 6 shows a block diagram for illustrating one embodiment of a still picture image reproducing apparatus which embodies the phase adjuster for a carrier chrominance signal according to the present invention.

DESCRIPTION OF THE PREFERRED EMBODIMENTS

Figure 1:
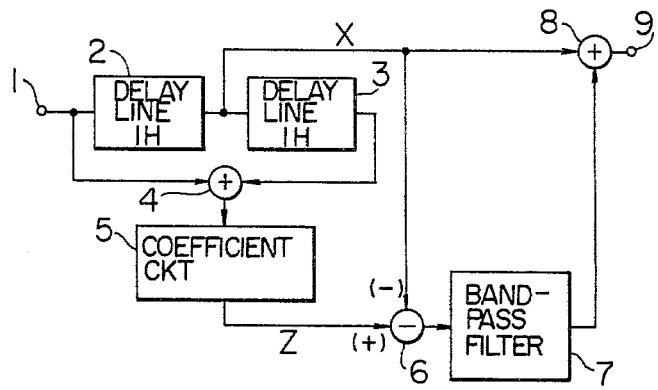
FIG. 1 shows a block diagram for illustrating a prior art phase adjuster for a carrier chrominance signal.

FIG. 1 shows a block diagram for illustrating a prior art phase adjuster for a carrier chrominance signal which shifts the phase of the carrier chrominance signal of the NTSC system composite color television signal by 180 degrees, that is, inverts the phase of the chrominance signal. The NTSC system composite color television signal applied to an input terminal 1 is fed to cascade-connected one-horizontal scan period (1H) delay lines 2 and 3. The phases of the carrier chrominance signals at the input of the delay line 2 and at the output of the delay line 3 differ by 180 degrees, respectively, from the phase of the carrier chrominance signal of the output signal X from the delay line 2. A mean value signal Z derived from an adder 4 and a ½-coefficient circuit has its phase of the carrier chrominance signal inverted relative to the signal X. The signal X is subtracted from the signal Z by a subtractor 6 an output of which is fed to a band-pass filter 7 which extracts a carrier chrominance signal component having a center frequency of a chrominance subcarrier ($f_{sc}$). It has a polarity which is reverse to that of the carrier chrominance signal of the signal X and an amplitude which is double to that of the carrier chrominance signal of the signal X. Accordingly, by adding the output of the filter 7 to the signal X by an adder 8, a composite color television having a polarity of the carrier chrominance signal inverted relative to the signal X is produced at an output terminal 9. Since the prior art phase adjusting system uses the analogy (correlation of the chrominance signals of adjacent scanning lines in a frame, the output at the filter 7 does not provide a correct carrier chrominance signal when there exists a vertical change of the chrominance components of the picture image as described above and hence the output at the output terminal 9 is distorted.

Figure 2A:
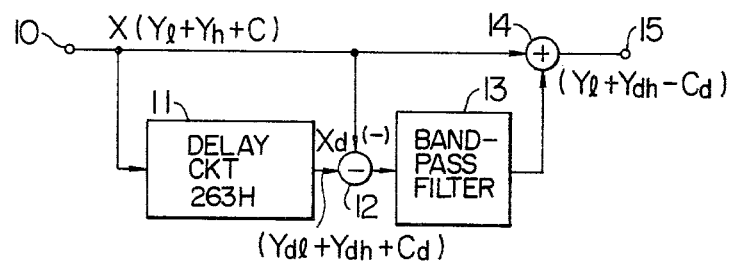
FIGS. 2A and 2B each show a block diagram for illustrating an embodiment of a phase adjuster for the carrier chrominance signal in accordance with the present invention.
Figure 2B:
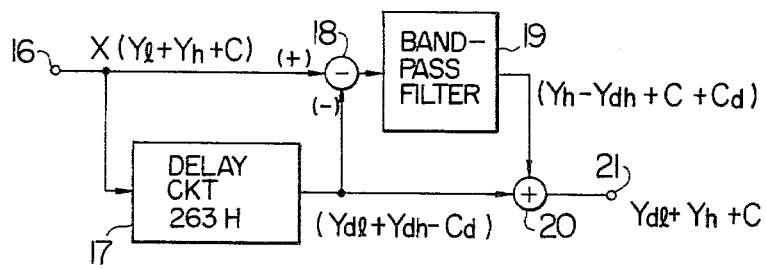

FIGS. 2A and 2B each show a block diagram for illustrating embodiments which embody the phase adjusting system for the carrier chrominance signal of the NTSC system composite color television signal according to the present invention. FIG. 2A utilizes a signal of a scanning line which is one field after relative to a current input signal to be phase-adjusted.

An NTSC system composite color television signal X applied to an input terminal 10 includes a low frequency component $Y_l$ and a high frequency component $Y_h$ of a luminance signal Y and a carrier chrominance signal C. A portion of the signal X is delayed by a delay circuit 11 having a delay time of one field (263H) so that an output signal $X_d$ therefrom has the polarity of the carrier chrominance signal inverted (or different by 180 degrees) relative to the input signal X and it includes a low frequency component $Y_{dl}$ and a high frequency component $Y_{dh}$ of a luminance signal $Y_d$ and a carrier chrominance signal component −(minus) Cd, where the minus(−) sign of the Cd indicates that the phase is inverted by 180 degrees. Accordingly, when the signal X is subtracted from the signal $X_d$ by a subtractor 12 and an output therefrom is fed to a band-pass filter 13 to extract a high-frequency component having a center frequency of a chrominance subcarrier $f_{sc}$, an output signal $Y_{dh}-Y_h-Cd-C$ is produced at the output of the filter 13. This output signal is added to the signal X by an adder 14 to produce a signal component $Y_l+Y_{dh}-Cd$. A high frequency component of this signal is a signal of a most adjacent scanning line on the screen. Since the distance between the scanning lines utilized is reduced to one-half distance relative to the prior art system shown in FIG. 1, the correlation between the carrier chrominance signal is enhanced and hence a high quality of phase-inverted signal of the carrier chrominance signal may be produced.

FIG. 2B shows a circuit arrangement for carrying out basically the same function as that of FIG. 2A. It differs from FIG. 2A only in that the positions of a subtractor 18 and a band-pass filter 19 are reversed relative to those of the subtractor 12 and the band-pass filter 13 of FIG. 2A. Thus, it is constructed to utilize a signal which is in one-field advance. By using the same symbols for the signals as those of FIG. 2A, a signal applied to an input terminal 16 is represented by $Y_l+Y_h+C$, an output of a delay line 17 is represented by $Y_d+Y_{dh}-Cd$, an output of the subtractor 18 is represented by $Y_l+Y_h+C-Y_{dl}-Y_{dh}+Cd$, an output of the filter 19 is represented by $Y_h-Y_{dh}+C+Cd$ and an output of an adder 20 is represented by $Y_{dl}+Y_h+C$. Thus, a signal having the phase of the carrier chrominance signal inverted relative to the output signal of the delay line 17 is produced at an output terminal 21.

Figure 3A:
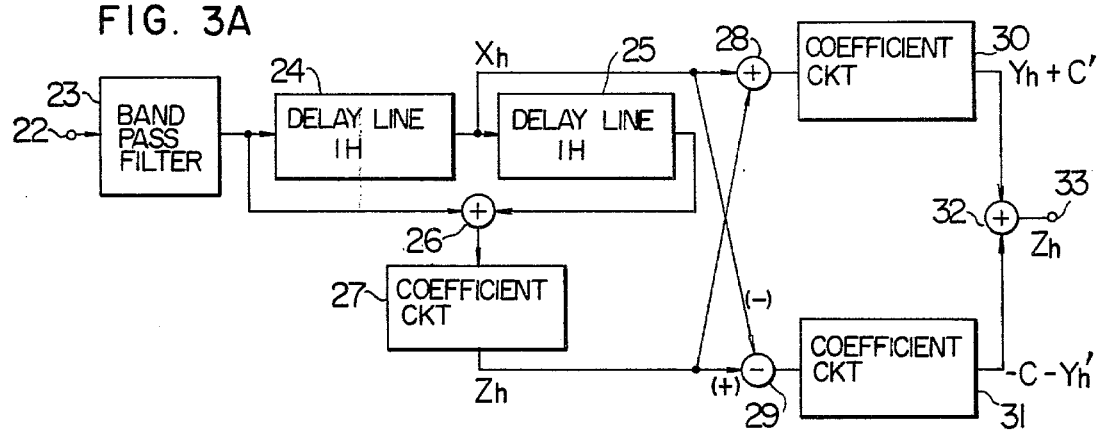
FIG. 3A shows a block diagram for illustrating an equivalent circuit of the prior art phase adjuster.
Figure 3B:
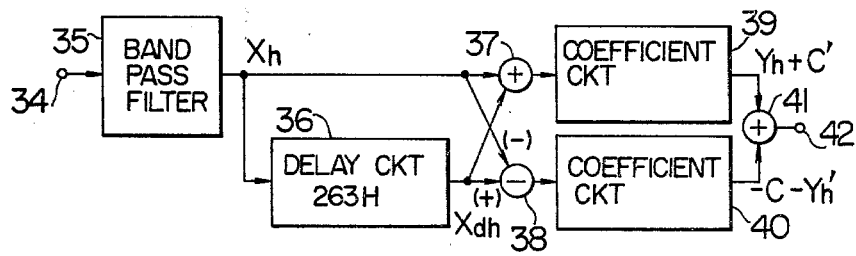
FIG. 3B shows a block diagram for illustrating an equivalent circuit for a high frequency component of FIG. 2A.

FIG. 3A shows a block diagram for illustrating an equivalent circuit of a high frequency component processing unit in the prior art system shown in FIG. 1 and FIG. 3B shows a block diagram for illustrating an equivalent circuit of a high frequency component processing unit in the system according to the present invention, as shown in FIG. 2A.

In FIG. 3A, an input color television signal is applied through an input terminal 22 and a band-pass filter 23 partly to an adder 26 directly and partly to the adder 26 through one-horizontal scan period delay lines 24 and 25. An output of the adder 26 is applied to a ½-coefficient circuit 27 which produces an output signal $Z_h$. The operation for producing the high frequency signal $Z_h$ can be readily understood from FIG. 1 and hence the explanation thereof is omitted here.

Figure 3C:
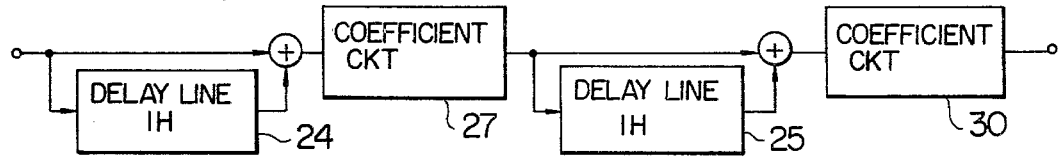
FIGS. 3C to 3F each show a block diagram of a filter circuit for illustrating the operations of the circuits of FIGS. 3A and 3B.
Figure 3D:
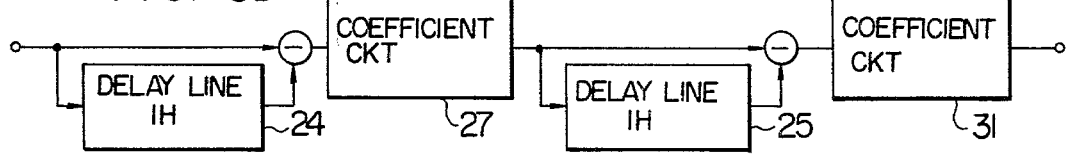

By averaging the signals $X_h$ and $Z_h$ by an adder 28 and a ½-coefficient circuit 30, an output signal which comprises a luminance signal component and a carrier chrominance signal component of the same polarity as the signals $X_h$ and $Z_h$ is produced. A circuit which covers the output of the band-pass filter 23 to the ½-coefficient circuit 30 is represented by a filter circuit as shown in FIG. 3C and a transfer characteristic of the filter represents a low-pass filtering characteristic of vertical component of the picture image. For the NTSC system television signal, it is expressed by;

$$\cos^2\left(\frac{2\pi}{525} \cdot f_v\right) \tag{1}$$

where $f_v$ is a vertical frequency. On the other hand, a circuit which covers the band-pass filter 23 to the ½-coefficient circuit 31 is represented by a filter circuit as shown in FIG. 3D which produces an output including components having reverse polarities to the signals $X_h$ and $Z_h$. A filtering characteristic is expressed by;

$$\sin\left(\frac{2\pi}{525} \cdot f_v\right) \tag{2}$$

Thus, the ½-coefficient circuit 31 produces an output signal having the polarity reverse to the signal $X_h$. By adding the outputs of the ½-coefficient circuits 30 and 31 together by an adder 32, only the signal $Z_h$ is produced at the output terminal 33, as is the case of FIG. 1.

In FIG. 3B, an input composite color television signal is applied through an input terminal 34 and a band-pass filter 35 to a one-field (263H) delay circuit 36. A portion of a delayed output signal $X_{dh}$ therefrom is added to the signal $X_h$ by an adder 37, an output of which is applied to a ½-coefficient circuit 39.

Figure 3E:
Figure 3F:
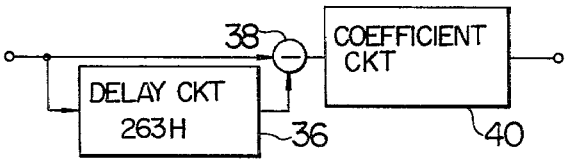

Other portion of the output from the delay circuit 36 is applied to a subtractor 38 where it is subtracted from the signal $X_h$ and an output of the subtractor 38 is applied to a ½-coefficient circuit 40. The ½-coefficient circuits 39 and 40 respectively produce a signal $Y_h + C'$ (mean value output) and a signal $(-C - Y_h')$ which is a polarity-reversed component of the signals $X_h$ and $Z_h$. The components $C'$ and $Y_h'$ may be regarded as error signals when the signals one-field before or after are used. The circuits which cover the filter 35 to the ½-coefficient circuit 39 and 40, respectively, can be represented as filter circuits as shown in FIGS. 3E and 3F, respectively, and their transfer characteristics are expressed, respectively, by:

$$\cos\left(\frac{\pi}{525} \cdot f_v\right) \tag{3}$$

$$\sin\left(\frac{\pi}{525} \cdot f_v\right) \tag{4}$$

They have frequency bands which are double of those of the formulas (1) and (2). FIGS. 4A to 4D illustrate the characteristics of the formulas (1) to (4). FIGS. 4A and 4B show desirable signal components, that is, the in-phase component of $Y_h$ and the reversed component of C, and FIGS. 4C and 4D show disturbing signal components, that is, $-Y_h'$ which is the reversed component of $Y_h$ and $C'$ which is the in-phase component of C. Curves designated by (a) show the characteristics by the prior art system shown by the formulas (1) and (2) and curves designated by (b) show the characteristics by the present system shown by the formulas (3) and (4). It is seen from FIGS. 4A and 4B that the desirable component area is expanded (shown by arrows) in the present system and from FIGS. 4C and 4D that the disturbing components are reduced. Accordingly, a ratio of the desirable component to the disturbing component is materially improved and less degraded and high quality of signal is produced.

FIG. 5 shows a block diagram for illustrating an embodiment of a noise reducer which embodies the phase adjusting system of the present invention. In FIG. 5, an NTSC system color television signal applied to an input terminal 43 is applied to a subtractor 44 which subtracts a signal of one-frame period before which has the polarity of the carrier chrominance signal inverted by a carrier chrominance signal phase adjuster 51, from the input signal in order to produce a difference signal therebetween. The output from the subtractor 44 comprises a motion information on an object and a noise component included in the input color television signal. A motion detector 46 discriminates those to control a non-linear coefficient circuit 45 so that a coefficient k approaches 0 at a stationary area of the object and to 1 at a mobile area of the object. An output of the non-linear coefficient circuit 45 is added to the signal which is one frame period after and which was phase-adjusted with respect to the carrier chrominance signal, by an adder 47 and an output from the adder 47 is applied to a frame memory 48. In this manner, the adder 47 produces a noise free NTSC system color television signal. Since the circuit arrangement and the operation of a noise reducer is well known, the detail thereof is not explained here.

The phase adjuster 51 for the carrier chrominance signal of the noise reducer uses the circuit shown in FIG. 2B. The frame memory 48 is divided into two delay circuit 49 and 50 having memory capacities of 262H and 263H, respectively, and by utilizing a signal which is in 263H advance to the one-frame period delayed output, a difference therebetween is calculated by a subtractor 52 and a band-pass filter 53 extracts a carrier chrominance signal component having a center frequency of a chrominance subcarrier $f_{sc}$, which is added to a frame memory output signal by an adder 54. In this manner, a signal having the phase of the carrier chrominance signal reversed with respect to the one-frame delayed signal is produced. This signal has a luminance signal low frequency component $Y_l$ which is one-frame delayed with respect to the input signal, and a luminance signal high frequency component $Y_h$ and a carrier chrominance signal component which are delayed by one field (262H). As a result, the phase of the carrier chrominance signal at the output of the adder 54 is same as the phase of the carrier chrominance signal of the color television signal applied to the input terminal 43 and hence a correct motion information can be detected. Since the one-field delayed signals rather than one-frame delayed signals are used for the luminance signal high frequency component and the chrominance signal, the tracking characteristic to the motion is improved and a persistent image is reduced. As a result, a higher noise reduction effect is attained and the quality of picture image is improved. When the output of the phase adjuster 51 for the carrier chrominance signal is taken from the output terminal 55 of the noise reducer, a signal of reduced persistent image can be obtained when the input signal includes much persistent image. FIG. 6 shows a block diagram for illustrating an embodiment of a still image reproducing apparatus which stores one frame of picture image signal in a memory and repeatedly reads it out. When the composite color television signal is the NTSC system signal, the phase of the carrier chrominance signal must change by 180 degrees from frame to frame. In FIG. 6, a frame memory stores one frame of composite color television signal. A timing signal generator 62 applies a readout signal having the same frequency as a sampling frequency to the frame memory 56 to read out a signal of a preselected address. A video signal X and a video signal $X_d$ which is one field (263H) delayed with respect to the signal X are read out simultaneously. A portion of the signal X is directly applied to an adder 60 while other portion of the signal X is applied to a subtractor 57, which subtracts the signal X from the signal $X_d$. An output of the subtractor 57 is applied to the adder 60 through a band-pass filter 58 having a center frequency of a chrominance subcarrier $f_{sc}$ and a switching circuit 59. Except the switching circuit 59 the circuit arrangement described above is identical to the phase adjuster for the carrier chrominance signal shown in FIG. 2A. The switching circuit 59 is adjusted in every frame period and an actuating signal is applied by the timing signal generator 62. As a result, a composite color television signal having the phase of the carrier chrominance signal changed by 180 degrees at every frame is produced at an output terminal 61.

Figure 7:
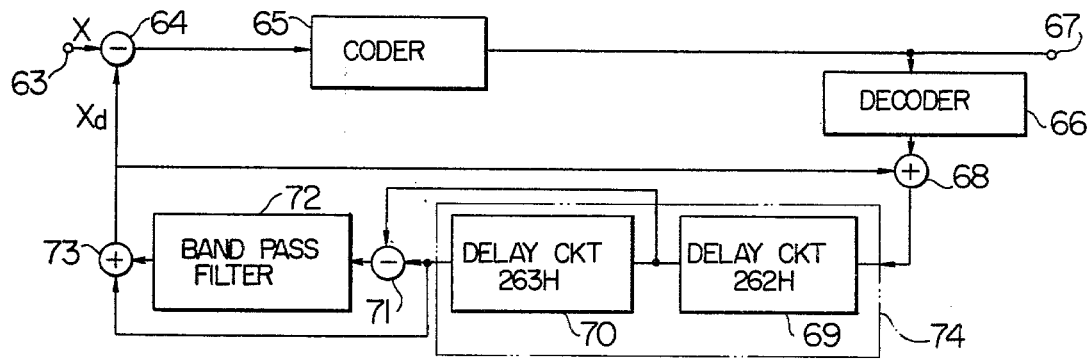
FIG. 7 shows a block diagram for illustrating an inter-frame differential encoder which embodies the phase adjuster for a carrier chrominance signal according to the present invention.

FIG. 7 shows a block diagram for illustrating an embodiment of an inter-frame differential encoding system for the composite color television signal in which only the change between succeeding frames is encoded for transmission. In FIG. 7, a subtractor 64 produces a difference signal between a current input color television signal X and a color television signal $X_d$ which is delayed by one frame period by a frame memory 74. This difference signal is encoded by an encoder 65 and an encoded signal is taken from an output terminal 67 as a transmission signal. A portion of the output of the encoder 65 is decoded by a decoder 66 and a decoded signal is added to the signal $X_d$ of one-frame after by an adder 68, an output of which is applied to the frame memory 74. The frame memory 74 is divided into a first delay circuit (262H) delay 69 and a second delay circuit (263H delay) 70. The input and output signals of the second delay circuit 70 are subtracted by a subtractor 71, an output of which is applied to an adder 73 through a band-pass filter 72 to add it to the output signal of the frame memory 74. As a result, a color television signal which is delayed by one frame period and which has the phase of the carrier chrominance signal identical to that of the input signal X is produced. A circuit which covers the second delay circuit 70 to the adder 73 corresponds to the phase adjuster for the carrier chrominance signal of the present invention. According to the present encoder, less area produces a difference signal and hence a coding efficiency is improved.

Figure 8:
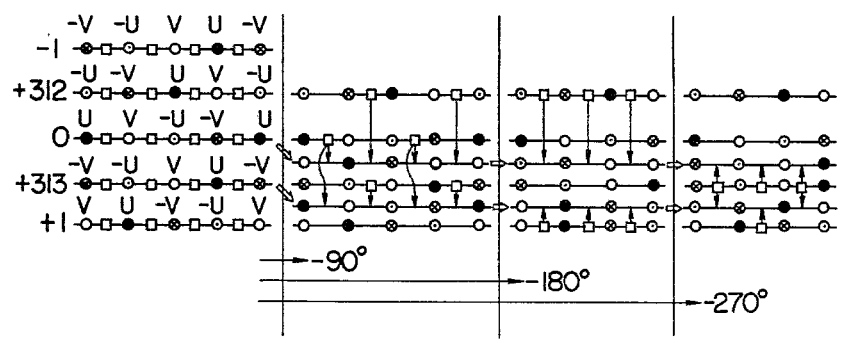
FIG. 8 illustrates four successive frames of carrier chrominance signals of a PAL composite color television signal.

While the embodiments explained above are applicable to the NTSC system composite color television signal, the present invention is also applicable to the PAL system composite color television signal. In the PAL system, the chrominance subcarrier frequency $f_{sc}$ has a phase retardation of 90 degrees per a horizontal scan period (1H) and a phase retardation of 180 degrees per field. Accordingly, a phase retardation of 90 degrees appears for a signal which is delayed by one frame period or 525H. Two different chrominance difference signals u and v are transverse-modulated with the chrominance subcarrier frequency with the signal v being polarity-inverted for every 1H before it is modulated. FIG. 8 illustrates the carrier chrominance signals of first frame to fourth frame. In FIG. 8, for the sake of convenience of illustration, the respective frames of a portion of a picture image are shown horizontally with the signals on the same scanning line being designated by double arrows. That is, a scanning line D of the first frame appears at a double arrow position in the second frame (i.e. the 626th line from the above mentioned scanning line). Symbols ⊙ and • represent minimum values and maximum values, respectively, of the chrominance difference signal u and symbols ⊗ and ○ represent minimum values and maximum values, respectively, of the chrominance difference signal v. The separation between the symbols corresponds to one quarter (¼) of the chrominance sub-carrier period, that is, the phase of 90 degrees. A symbol □ represents a sampling phase. It shows that sampling occurs at a frequency of 4 $f_{sc}$ which is four times as high as the chrominance subcarrier frequency $f_{sc}$.

When the sampling phase is selected to the positions of 45 degrees, 135 degrees, 225 degrees and 315 degrees relative to the signal u as shown, the amplitude and the polarity of the 90-degrees retarded signal of the second frame are identical to those of every other samples of the same scanning line of the preceding frame (first frame) and the scanning line immediately above that scanning line, as shown by single-arrows. The signal of the third frame which is retarded by 180 degrees relative to the first frame coincides to the sample of the scanning line of the first frame immediately above that (first field) or immediately below that (second field). The signal of the fourth frame which is retarded by 270 degrees coincides to every other samples of the same scanning line and every other samples of the scanning line immediately below that with respect to the scanning line of the first frame which is immediately below that (first field) or the scanning line of the second field. By utilizing the above relation, four frames of color sequence can be produced from the composite color television signal stored in the frame memory by extracting only the carrier chrominance component having the center frequency of a chrominance subcarrier $f_{sc}$ by the bandpass filter to produce the high frequency component of the scanning line shown by arrows.

Figure 9:
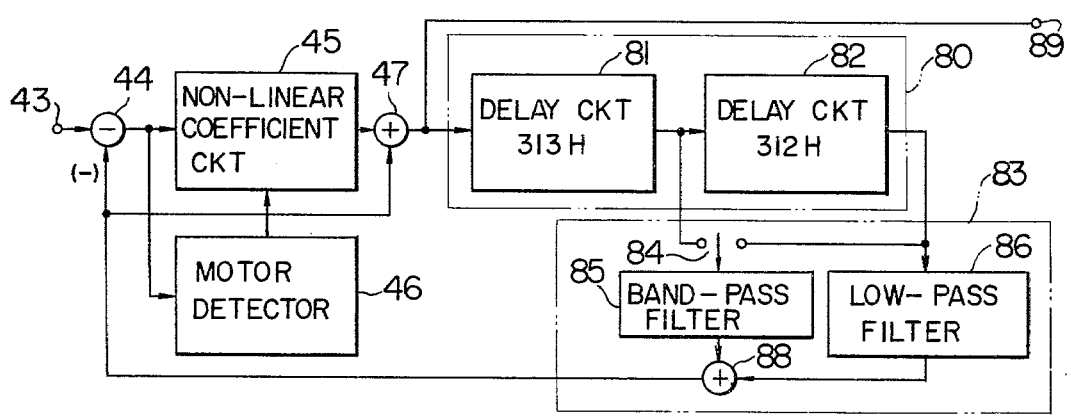
FIG. 9 shows a block diagram for illustrating one embodiment of a noise reducer which embodies the phase adjuster for a carrier chrominance signal according to the present invention.

FIG. 9 shows a block diagram for illustrating an embodiment of a noise reducer for the PAL system color television signal which embodies the phase adjusting system for the carrier chrominance signal of the present invention. Main portion for the noise reduction is identical to that shown in FIG. 5 and hence the operation thereof is not explained here. A phase adjuster for the carrier chrominance signal is explained below. Since a chrominance signal phase of a one-frame delayed signal is to be retarded by 90 degrees in the present embodiment, it corresponds to the case where the signal of the second frame is produced from the signal of the first frame shown in FIG. 8. Thus, a frame memory 80 is divided into two delay circuits 81 and 82 having capacities of 313H and 312H, respectively, and samples shown by arrows in FIG. 8 are selected by a switching circuit 84 which is actuated at a sampling frequency using the input and output signals of the delay circuit 82 and the carrier chrominance signal having the center frequency of a chrominance subcarrier $f_{sc}$ is extracted by a band-pass filter 85. On the other hand, a low frequency component of the one-frame delayed signal from the output of the delay circuit 82 is extracted by a low-pass filter 86, and those components are added together in an adder 88 to produce a signal which is retarded by 90 degrees relative to the one-frame delayed signal, that is, a signal having a carrier chrominance signal which is in phase with the PAL system color television signal applied to the input terminal 75.

While FIG. 9 shows the noise reducer for the PAL system color television signal, it will be readily understood from the explanation of FIG. 8 that the present invention is also applicable to a still picture image reproducing apparatus and an inter-frame encoder for the PAL system color television signal.

As explained hereinabove, according to the present invention, the high frequency component of the scanning line which is separated by one field and adjacent to the current scanning line on the screen is extracted and the phase-adjusted signal is produced. Accordingly, a high quality of signal which includes few oblique component of luminance signal due to the phase adjustment of the carrier chrominance signal and less degradation to vertical chrominance change can be produced. The present invention, therefore, offers a great advantage to the inter-frame encoder, the noise reducer and the color frame reproduction in the still picture image reproducing apparatus for the composite color television signal.

I claim:

1. A circuit arrangement for changing a phase of a carrier chrominance signal of a composite color television signal comprising:
   a source of a composite color television signal in which a chrominance subcarrier modulated with chrominance components is superimposed on a luminance signal;
   a delay means for delaying said composite color television signal by one-field period;
   a means for producing a difference signal between said composite color television signal and an output signal of said delay means;
   a filter for extracting a high frequency component of said difference signal; and
   an adder means for adding an output signal of said filter to said composite color television signal to change the phase of the carrier chrominance signal of said composite color television signal.

2. A circuit arrangement according to claim 1, wherein said composite color television signal is an NTSC system color television signal and said delay means has a delay time which is 263 times as long as one horizontal scan period.

3. A circuit arrangement according to claim 1, wherein said composite color television signal is an NTSC system color television signal, said phase adjuster further comprising an output means for alternately selecting the output signal of said delay means and the output signal of said adder means at every frame period.

4. A circuit arrangement according to claim 1, wherein said composite color television signal is a PAL system color television signal and said delay means has a delay time which is 312 times as long as one horizontal scan period, said output signal of said delay means being applied to said adder means through a low-pass filter.

5. A circuit arrangement according to claim 4 further comprising a means for selectively applying said composite color television signal and said output signal of said delay means to said filter at a sampling frequency.

6. A circuit arrangement according to claim 4, wherein said sampling frequency is equal to one quarter of the chrominance subcarrier frequency of said composite color television signal.

7. A circuit arrangement for changing a phase of a carrier chrominance signal of a composite color television signal comprising:
   a source of a composite color television signal in which a chrominance subcarrier modulated with chrominance components is superimposed on a luminance signal;
   a delay means for delaying said composite color television signal by one-field period;
   a means for producing a difference signal between said composite color television signal and an output signal of said delay means;
   a filter for extracting a high frequency component of said difference signal; and
   an adder means for adding an output signal of said filter to said output signal of said delay means to produce a phase-shifted carrier chrominance signal in said composite color television signal.

* * * * *